United States Patent [19]
Park et al.

[11] Patent Number: 5,709,795
[45] Date of Patent: Jan. 20, 1998

[54] FLUID FILTRATION SYSTEM HAVING A FLUID HOSE STORAGE SYSTEM

[75] Inventors: Eric Y. Park; David Knaub; David Thorpe; Howard Barney; Joshua Hoyt, all of Portland, Oreg.

[73] Assignee: Ziba Design, Inc., Portland, Oreg.

[21] Appl. No.: 689,706

[22] Filed: Aug. 16, 1996

Related U.S. Application Data

[62] Division of Ser. No. 372,649, Jan. 13, 1995, Pat. No. 5,549,010.

[51] Int. Cl.$^6$ ............................................. B01D 35/30
[52] U.S. Cl. .................................. 210/460; 210/463
[58] Field of Search ............................ 210/232, 416.1, 210/416.2, 416.3, 460, 463

[56] References Cited

U.S. PATENT DOCUMENTS

| | | | |
|---|---|---|---|
| 3,926,815 | 12/1975 | McClory | 210/424 |
| 4,701,258 | 10/1987 | Billiet et al. | 210/232 |
| 5,089,131 | 2/1992 | Gentry | 210/253 |
| 5,130,020 | 7/1992 | Meckstroth | 210/416.3 |
| 5,334,163 | 8/1994 | Sinnett | 604/236 |
| 5,441,071 | 8/1995 | Doherty et al. | 137/15 |
| 5,454,944 | 10/1995 | Clack | 210/263 |
| 5,472,064 | 12/1995 | Viken | 184/1.5 |
| 5,558,762 | 9/1996 | Fife et al. | 210/416.3 |

OTHER PUBLICATIONS

"H$_2$ On Tap: A Water Filter," Advertising Brochure of Water Resources International, 2800 East Chambers, Phoenix, Arizona. no date.

"TerraFlo Filter (Part Nos. 42-622 and 46-623)," Real Goods Catalog, p. 45. no date.

"The Water Factory," Advertising Brochure Form No. 98-860012 of Water Factory Systems, 68 Fairbanks, Irvine, California, Copyright Water Factory Systems, Jan. 1992.

"The Aqua-Pure Drinking Water System . . . ," Advertising Brochure Form No. L1TDWSSTUF of CUNO, Inc. Consumer Products, 400 Research Parkway, Meriden, Connecticut, Oct. 1992.

"Pur Genius FM1200 Water Filter (Item No. 30820)," SuperLife Catalog, p. 50, Zygon International. no date.

"Mizrich (Part Nos. PJ-300MR and PJ-40MRF)," Advertising Brochure of National Human Electronics, pp. 5 and 6, 1994.

"Super Speedfit," Advertising Brochure Form No. Z2105/25/5.93 of John Guest USA Inc., 20-A Commerce Way, Totowa, New Jersey, 1993.

"Quick Couplings And Fittings For Plastic Tubing," Advertising Brochure Form No. CP-2 393 of Colder Products Company, 1001 Westgate Drive, St. Paul, Minnesota, 1993.

*Primary Examiner*—W. L. Walker
*Attorney, Agent, or Firm*—Stoel Rives LLP

[57] ABSTRACT

A readily serviceable ancillary fluid filtration system has a filter element enclosed in a container with a hose storage system. The container has a hose storage compartment for storing any unneeded length of hose. A hose management guide structure is located within the hose storage compartment to facilitate adjustment of the lengths of the hoses and storage of any unneeded length of hose after fluid filter assembly installation. The hose management guide structure includes multiple spaced-apart pegs placed within the hose storage compartment so that the hoses travel along a serpentine path within the hose storage compartment as they are fed lengthwise therein.

13 Claims, 15 Drawing Sheets

U.S. Patent    Jan. 20, 1998    Sheet 1 of 15    5,709,795
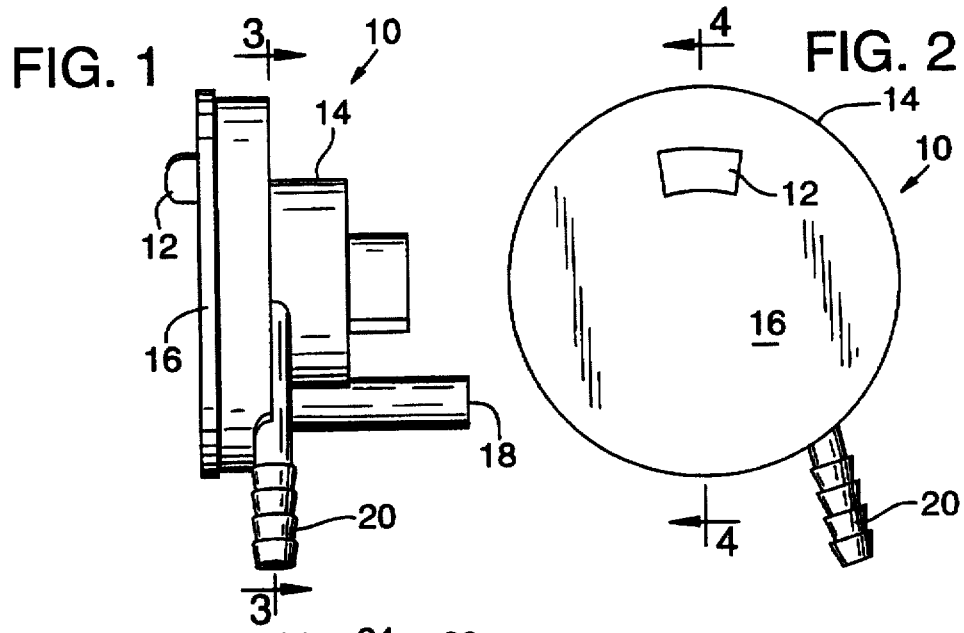
FIG. 1
FIG. 2
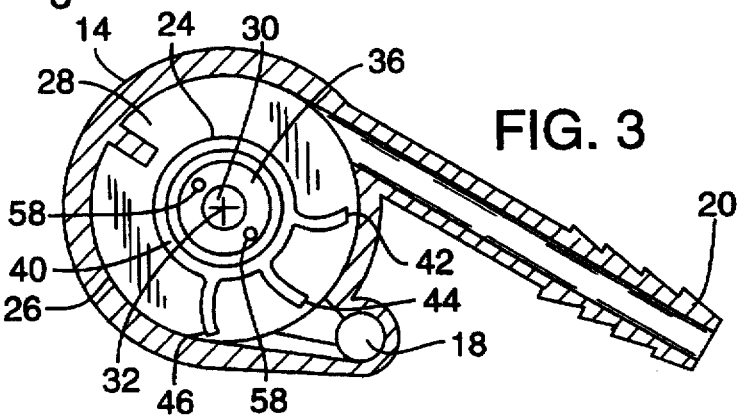
FIG. 3
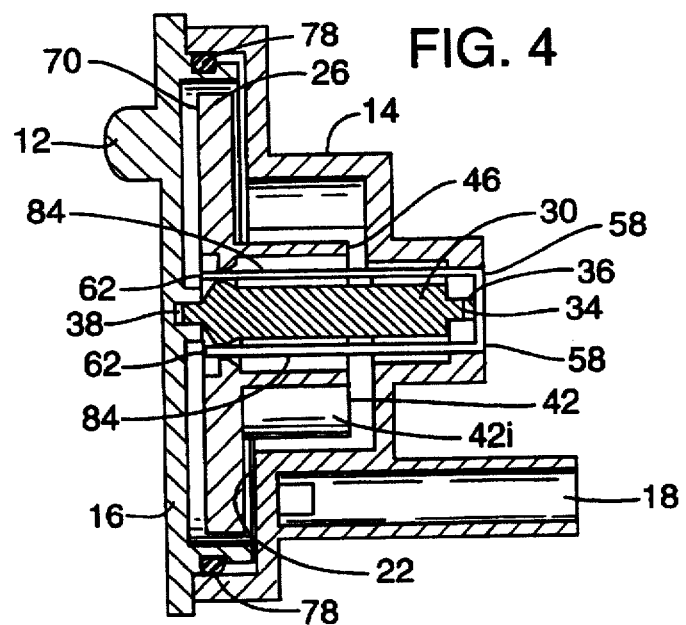
FIG. 4

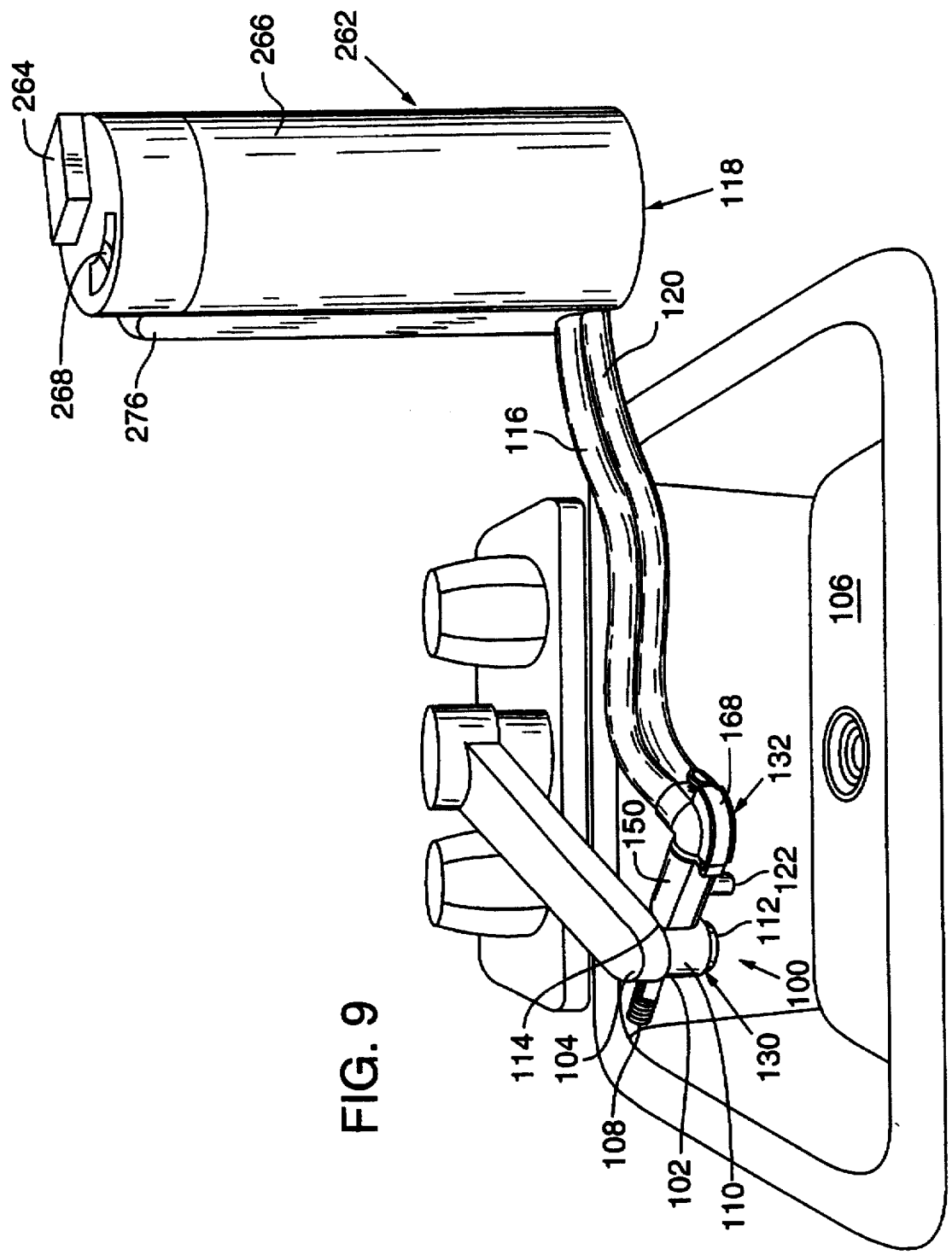

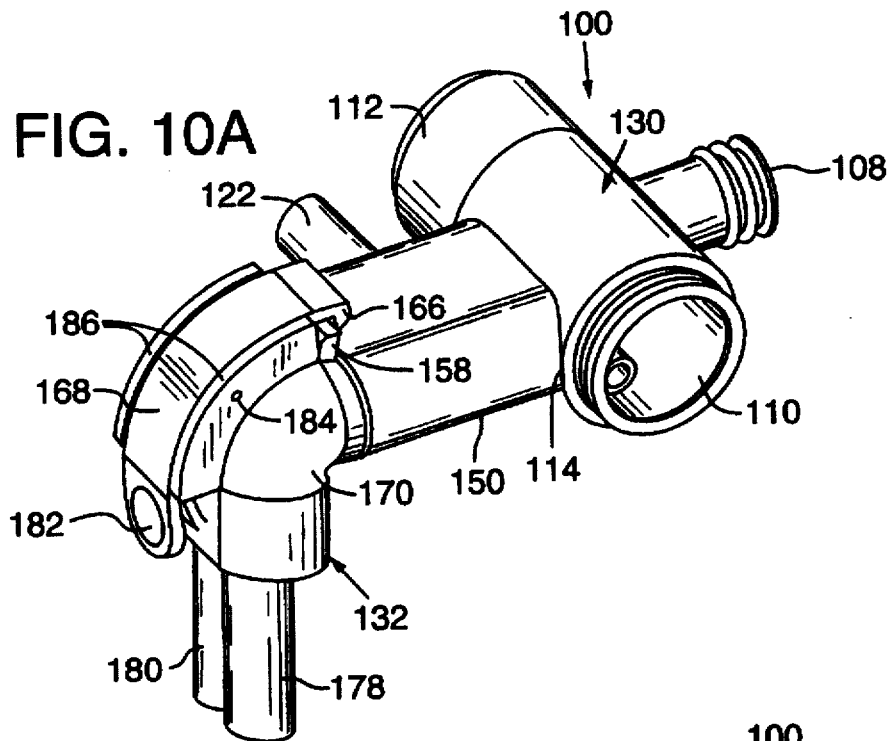
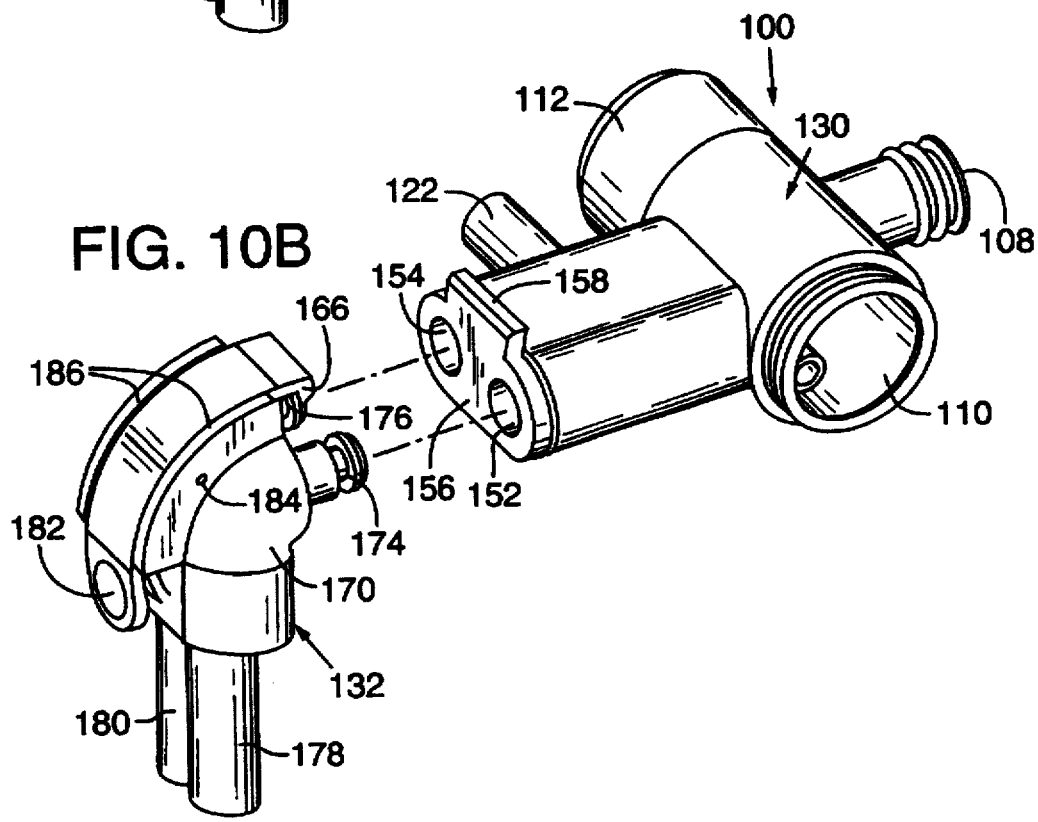

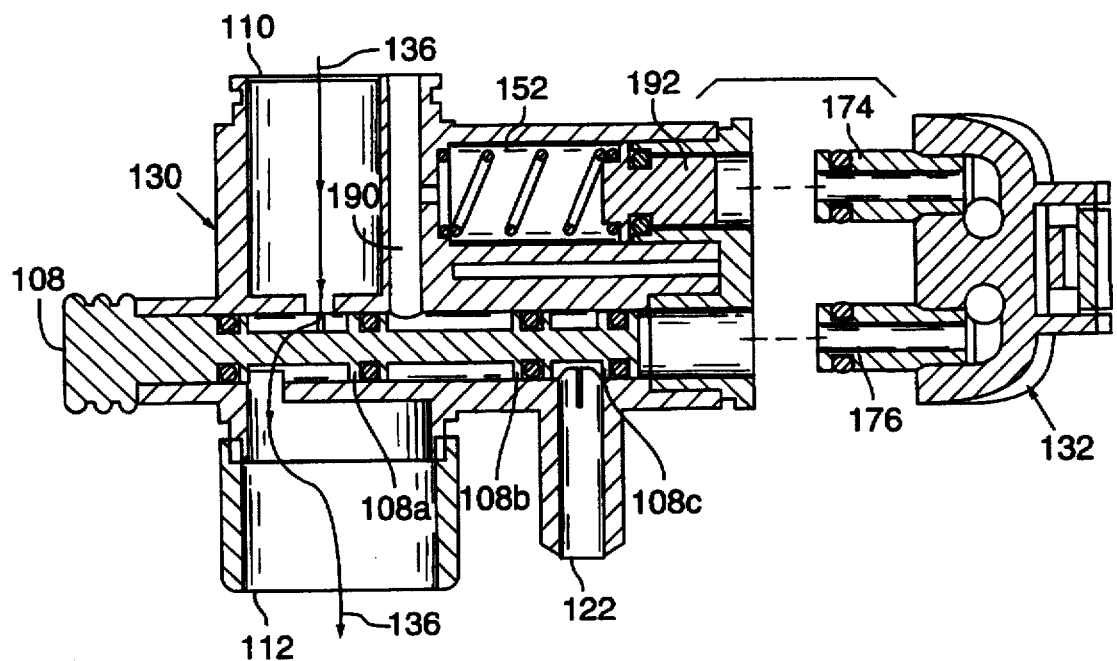
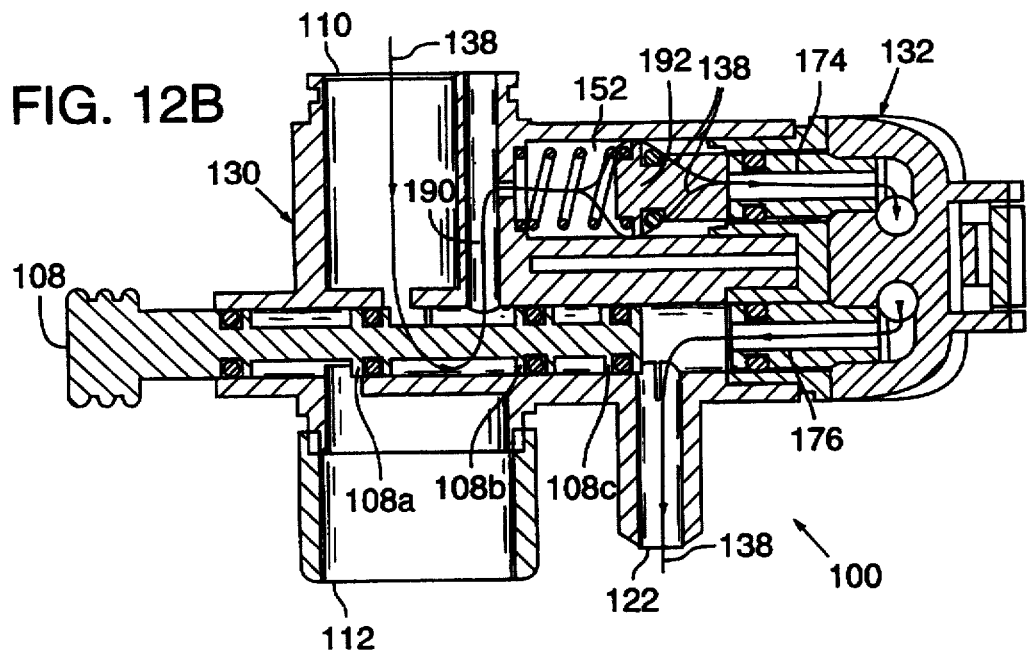

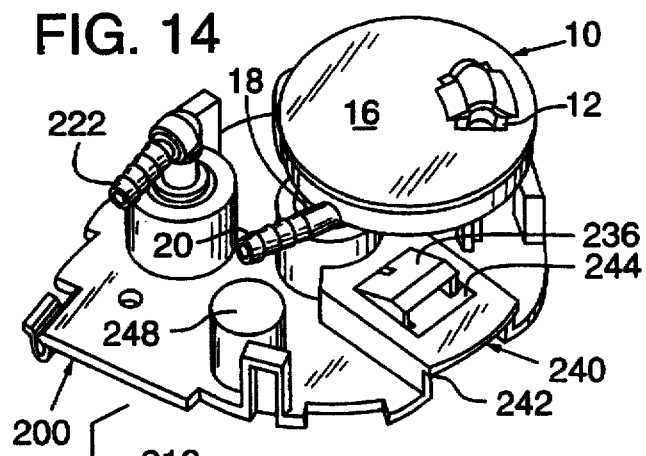
FIG. 14
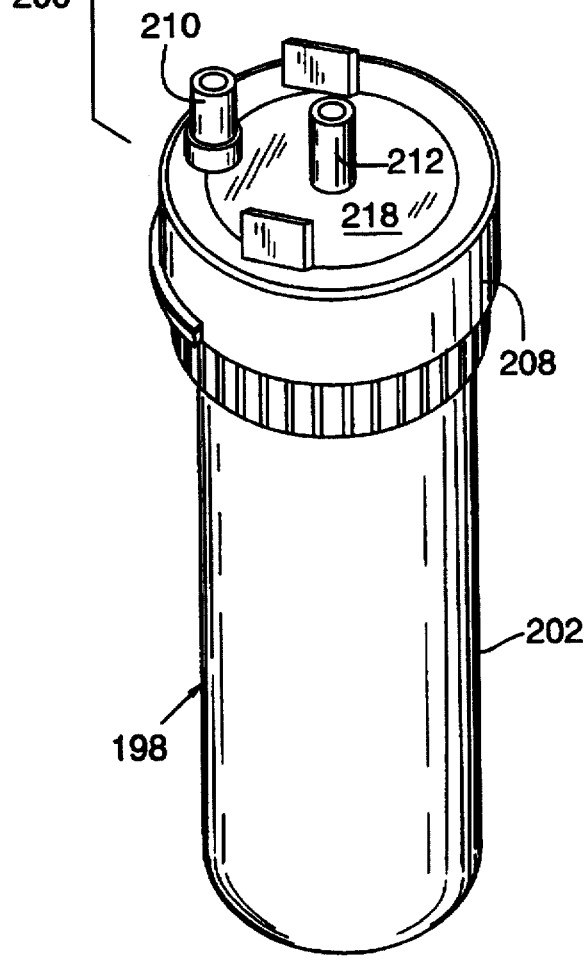
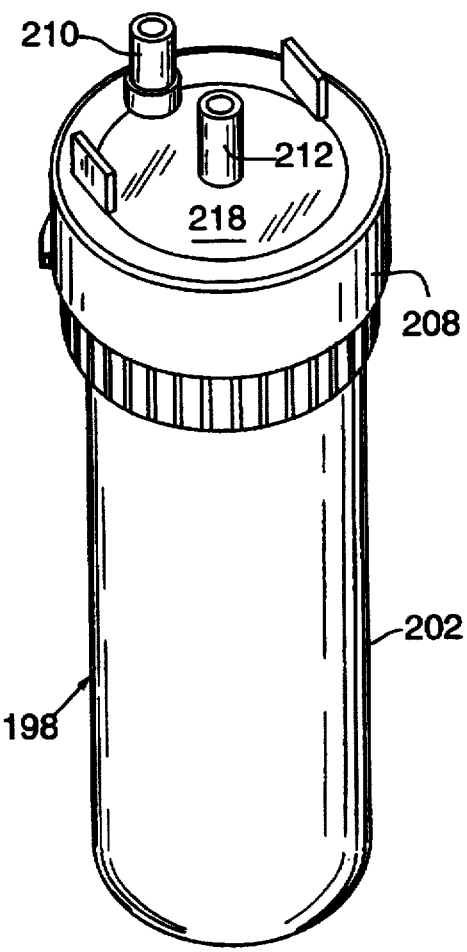
FIG. 15A

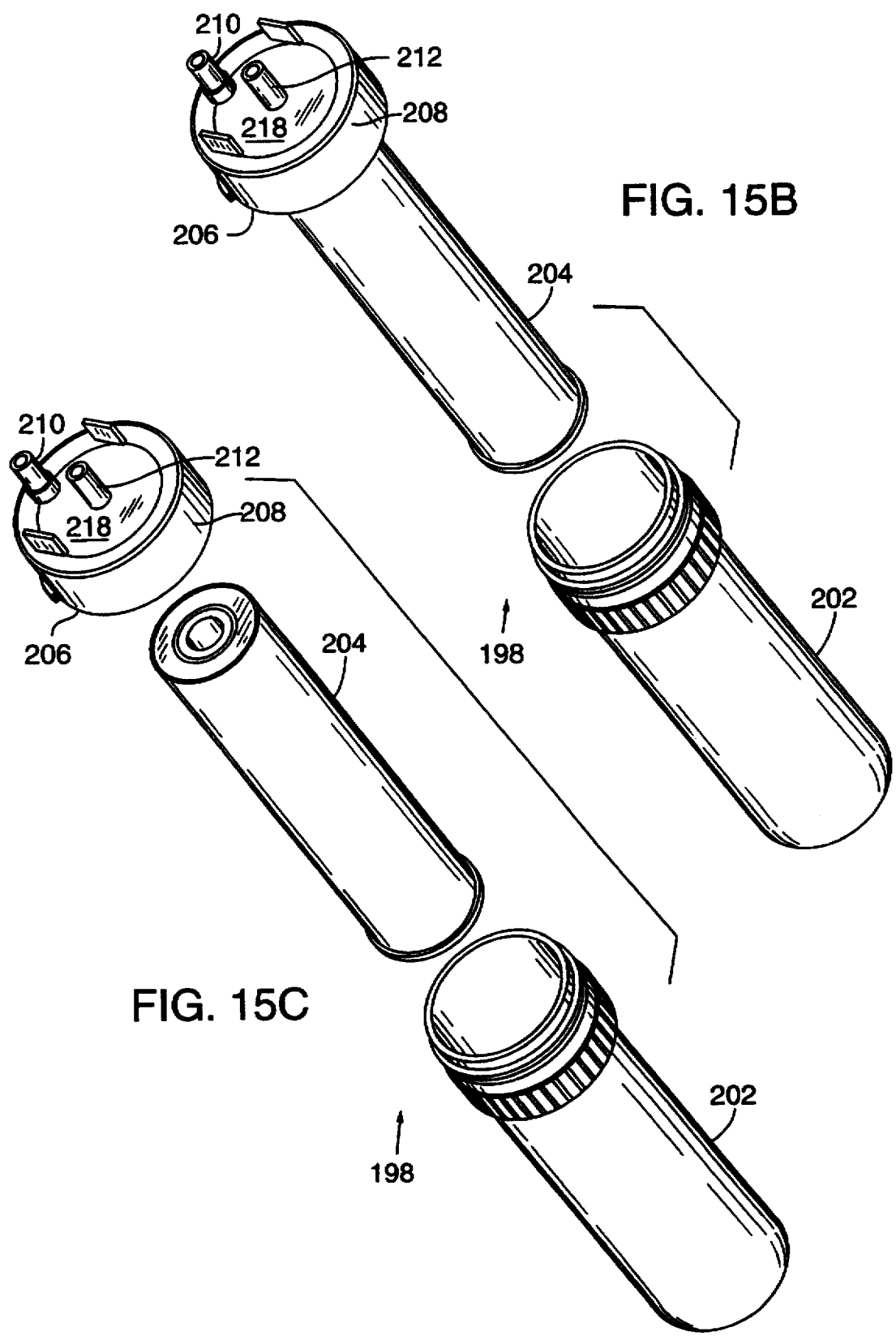

FIG. 19
FIG. 20
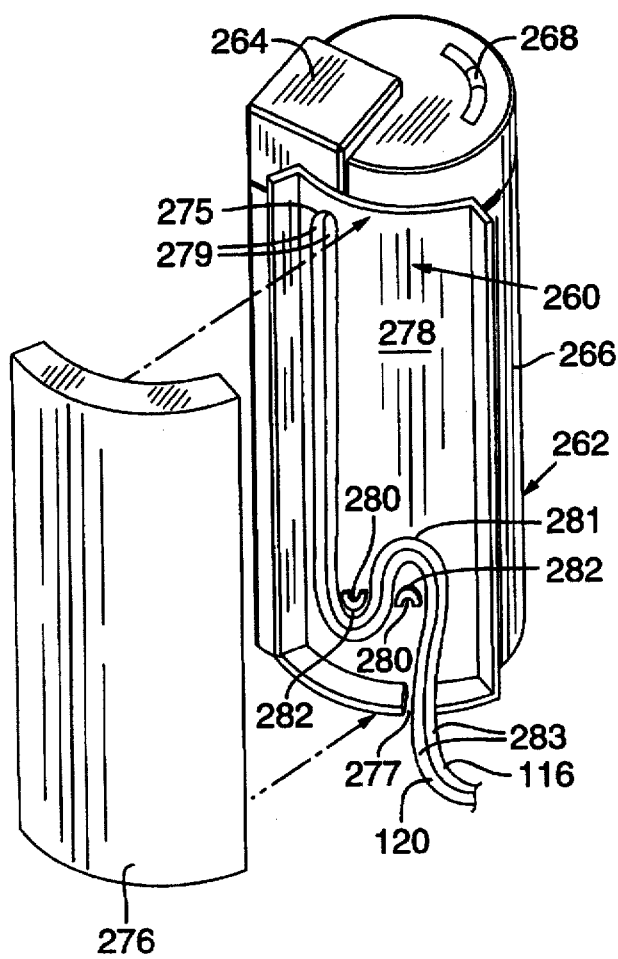
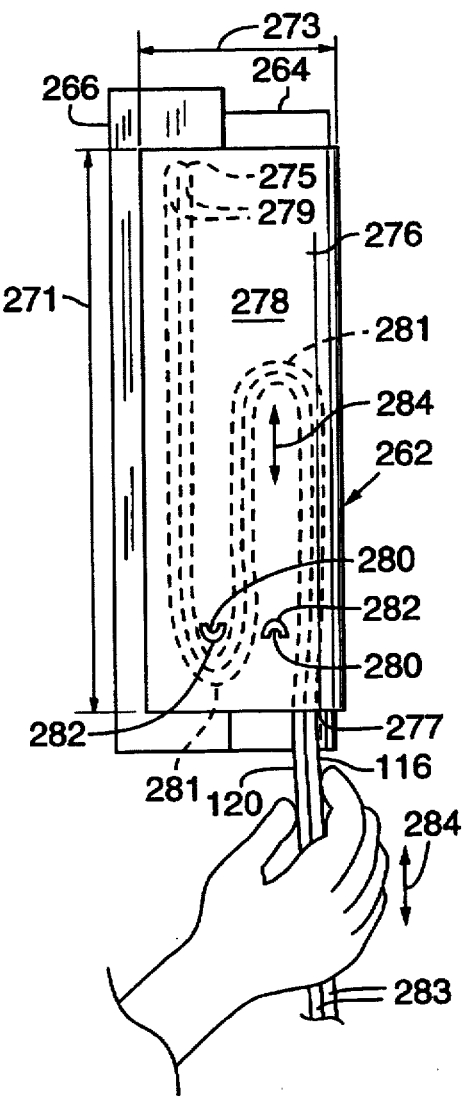
FIG. 21
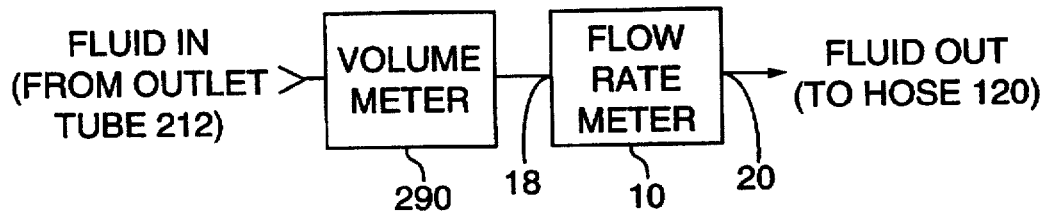

FLUID FILTRATION SYSTEM HAVING A FLUID HOSE STORAGE SYSTEM

This is a division of application Ser. No. 08/372,649, filed Jan. 13, 1995, now U.S. Pat. No. 5,549,010.

TECHNICAL FIELD

This invention relates to fluid purification systems and, in particular, to a visual fluid flow rate indicator and quick-release hose fitting for use with an easily serviceable ancillary fluid filtration system.

BACKGROUND OF THE INVENTION

A conventional household water faucet and sink assembly does not incorporate a filtration system as an integral part of the water delivery system. To filter city-supplied or well water before it reaches the faucet outlet orifice, a user typically attaches at the outlet orifice a manually actuatable diverter that diverts the water flow path through a replaceable particle filter assembly. The diverter has separate outlet and inlet hose barbs that receive respective outlet and inlet hoses connected to the filter assembly and is equipped with a valve stem that the user pulls to route the water flow path through the filter before the water discharges from a diverter discharge outlet.

There are several problems associated with the delivery of water through such ancillary water filtration systems. First, there is no convenient indicator of the accumulation of particles that clog the filter and cause a progressive drop in the water discharge pressure from the faucet outlet. Second, connection of the filter hoses to the hose barbs is so unwieldy that a user typically keeps the hose assembly permanently connected to the diverter and thereby tolerates less sink clearance. Third, the particle filter assembly usually includes a replaceable filter cartridge that is difficult to remove for cartridge renewal and system maintenance.

SUMMARY OF THE INVENTION

The present invention is an ancillary filtration system that overcomes the above-described problems. A preferred embodiment of the filtration system includes a visual flow rate indicator that is positioned between the outlet port of a cartridge filter and the outlet port of a quick-release fitting that connects to a manually actuatable diverter coupled to a household water faucet.

The flow rate indicator includes a housing that encloses an impeller having multiple spaced-apart vanes positioned about an axis of rotation so that incoming fluid passing through an inlet port to the housing strikes at least one of the vanes to angularly displace the impeller. A torsionally resistant element such as a bifilar wire operatively connects the impeller to the housing to bias the impeller to resist its angular displacement at a position that is indicative of the incoming fluid flow rate. The impeller has a surface with angularly spaced color-coded regions that change their positions relative to a window in the housing. An observer can view through the window the color of the impeller and thereby ascertain the incoming fluid flow rate.

The quick-release fitting attaches to and receives fluid flowing from a manually actuatable diverter that is attached to the faucet outlet. The diverter includes a body with a conduit extension formed as an integral part thereof. The conduit extension has tubular inlet and outlet conduits and a fluid discharge outlet in fluid communication with the outlet conduit. The quick-release fitting includes a holder for inlet and outlet tubes, each of which mates at one end with a corresponding inlet and outlet conduit of the diverter body.

The fitting carries a pivotally mounted lever arm that functions as a manually actuatable push tab-release mechanism. The lever arm has a hooked endpiece that fits over a flange extending from the diverter body to secure the inlet and outlet tubes in place in their respective conduit extensions. A user squeezes the free end of the lever to release the hooked end from the flange and either inserts the tubes into or withdraws the tubes from the diverter conduits. The other ends of the inlet and outlet tubes receive and hold in place by compression the respective inlet and outlet hoses extending from the cartridge filter.

The inlet port of the flow meter and the outlet of the diverter are in fluid communication with, respectively, an outlet and an inlet of a manifold that is releasably securable to a cartridge filter assembly. At least one of the inlet and outlet of the manifold has a push-in fitting into which a tube can be inserted. The cartridge filter assembly includes a filter cartridge enclosed in a housing covered by an end cap having an inlet tube and an outlet tube that are matable with, respectively, the inlet conduit and outlet conduit of the manifold. A lever mechanism is pivotally mounted to the manifold in a position that directs a force against the push-in fitting in response to a force applied to the lever by a user to release the tube from the fitting. A spring then helps to separate the end cap and thus the housing from the manifold.

Additional objects and advantages of this invention will be apparent from the following detailed description of preferred embodiments thereof which proceeds with reference to the accompanying drawings.

BRIEF DESCRIPTION OF THE DRAWINGS

FIGS. 1 and 2 are respective side elevation and plan views of the flow rate meter of the present invention.

FIG. 3 is a sectional view taken along lines 3—3 of FIG. 1.

FIG. 4 is a sectional view taken along lines 4—4 of FIG. 2.

FIG. 9 is a pictorial view of a household faucet to which the diverter and filter assembly of the invention are connected.

FIGS. 10A and 10B are isometric views of the diverter with the quick-release fitting connected to and disconnected, respectively, from the conduit extension of the diverter.

FIGS. 12A and 12B are cross-sectional views taken along lines 12—12 of FIG. 11A showing the interior of the diverter when the valve stem is, respectively, inserted to direct fluid flow without diversion and retracted to divert fluid flow.

FIG. 14 is an exploded view of the fluid filter assembly of FIG. 13.

FIGS. 15A, 15B, and 15C are respective isometric views of the cartridge filter of FIGS. 13 and 14 completely assembled, disassembled, and exploded apart to show its components.

FIGS. 19 and 20 show the interior of a hose management system for storing unused lengths of hose in the shell-like container of FIGS. 18A and 18B for the cartridge filter of the invention.

FIG. 21 is a block diagram that shows in an alternative embodiment a volume meter positioned upstream of the flow rate meter to provide to a user information about the remaining useful life of the filter element of the cartridge filter of FIGS. 15A, 15B, and 15C.

DETAILED DESCRIPTION OF PREFERRED EMBODIMENTS

Figure 5A:
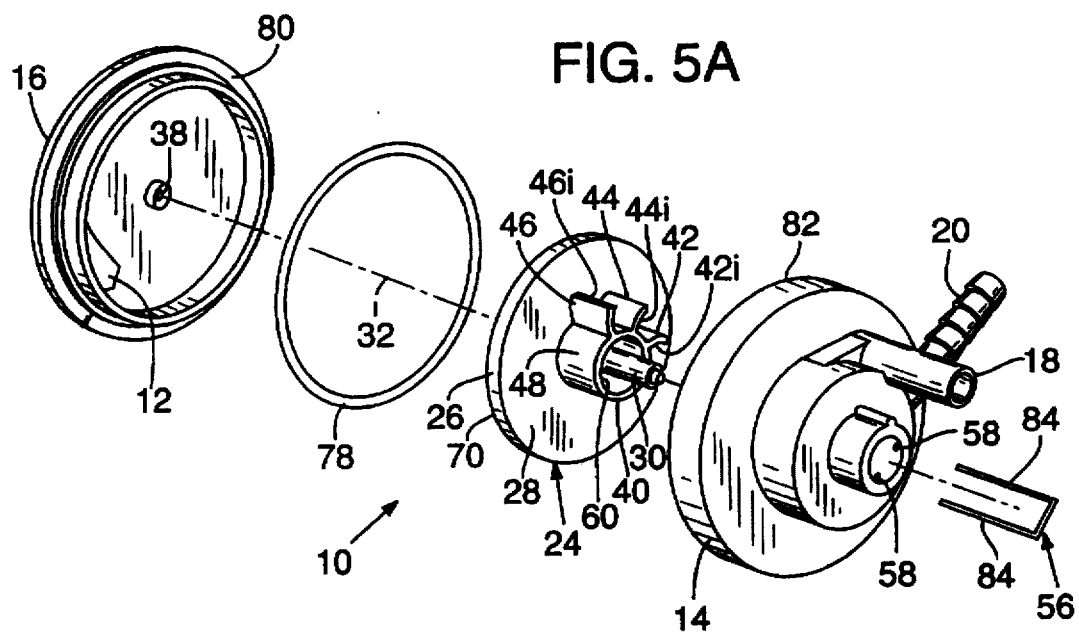
FIGS. 5A and 5B are exploded views of the flow rate meter of FIGS. 1 and 2 showing the internal components as viewed in a direction toward the meter housing and the indicator window, respectively.
Figure 5B:
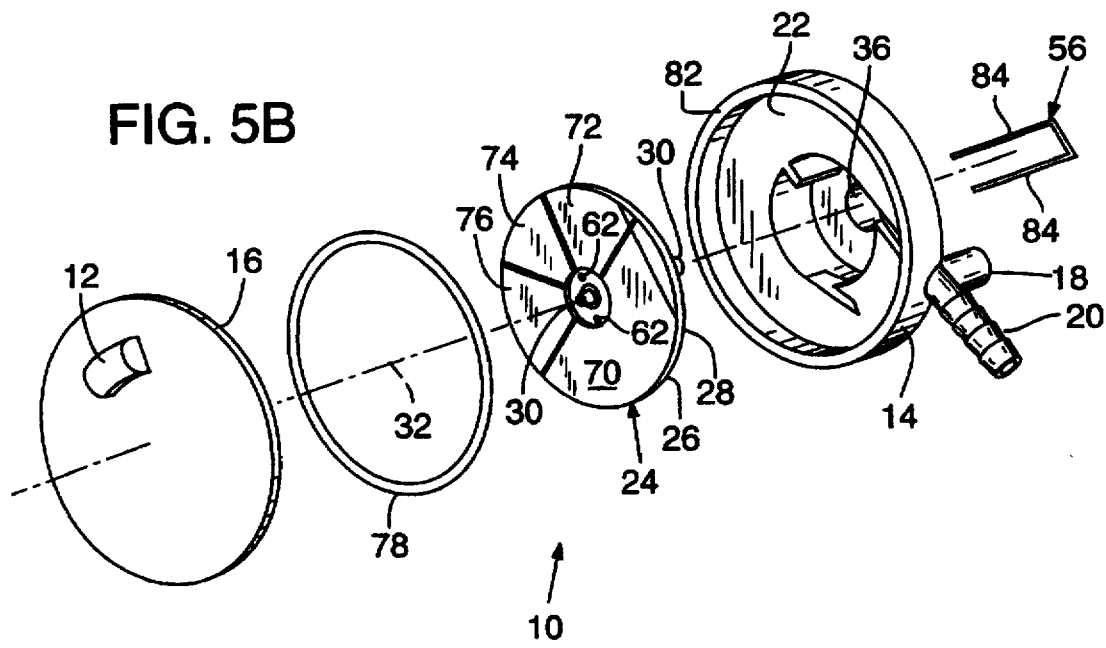

FIGS. 1–4 and FIGS. 5A and 5B show different views of a fluid flow rate meter 10 that has a window 12 through which a viewer can get a visual indication of the incoming fluid flow rate. Flow rate meter 10 is preferably constructed of a plastic material. With reference to FIGS. 1 and 2, flow rate meter 10 comprises an enclosed hollow body formed by a housing 14 and an indicator cap 16. A fluid (typically a liquid such as water) enters housing 14 through an inlet port 18 and exits housing 14 through an outlet port 20.

With reference to FIGS. 3, 4, 5A, and 5B, housing 14 has extending inwardly from its inner side surface a recessed, annular step 22 that subdivides the interior of housing 14 into two regions of different volumes. An impeller 24 fits into the region whose diameter is set by the inner diameter of annular step 22. Impeller 24 includes a disk 26 having a lower surface 28 from which a shaft 30 extends to define an axis of rotation 32 for the impeller. One end of shaft 30 fits into a cup 34 whose side extends from a floor 36 of housing 14 and the other end of shaft 30 fits into a hole 38 of cap 16 to secure impeller 24 in place and permit it to move about its axis of rotation 32 in response to the flow rate of fluid entering inlet port 18. A cylindrical sleeve 40 fits over shaft 30 and mounts against surface 28 of disk 26. Three arcuate vanes 42, 44, and 46 extend radially from and are angularly spaced about an outer surface 48 of cylindrical sleeve 40 to receive the liquid flowing into inlet port 18.

A U-shaped torsionally resistant element or wire 56 extends through two holes 58 in floor 54, along the inner surface 60 of cylindrical sleeve 40, and into two holes 62 in disk 26. Wire 56 may also be embedded in floor 54 during the formation of housing 14 by a molding process. Torsionally resistant element 56 counteracts the angular displacement of impeller 24 about its axis of rotation 32 in response to the flow of fluid against at least one of vanes 42, 44, and 46.

Disk 26 has an upper surface 70 on which color-coded segments 72, 74, and 76 are angularly spaced. Color-coded segments 72, 74, and 76 are placed on surface 70 in relation to the angular placement of vanes 42, 44, and 46 so that they can be viewed through window 12 as an indicator of the rate of fluid flow through flow rate meter 10. Skilled persons will appreciate that there are many other ways using the angular displacement of disk 26 to indicate flow rate. The division of the interior of housing 14 into two regions of different sizes provides a smaller region with a volume that is suitably sized for operating impeller 24 and a larger region to house a more readily viewable indicator on disk 26. The operation of impeller 24 as a flow rate indicator is described more fully below.

An O-ring 78 forms a tight seal between a shoulder surface 80 of indicator cap 16 and the circular periphery 82 of the base of housing 14 when flow rate meter 10 is assembled.

Figure 6A:
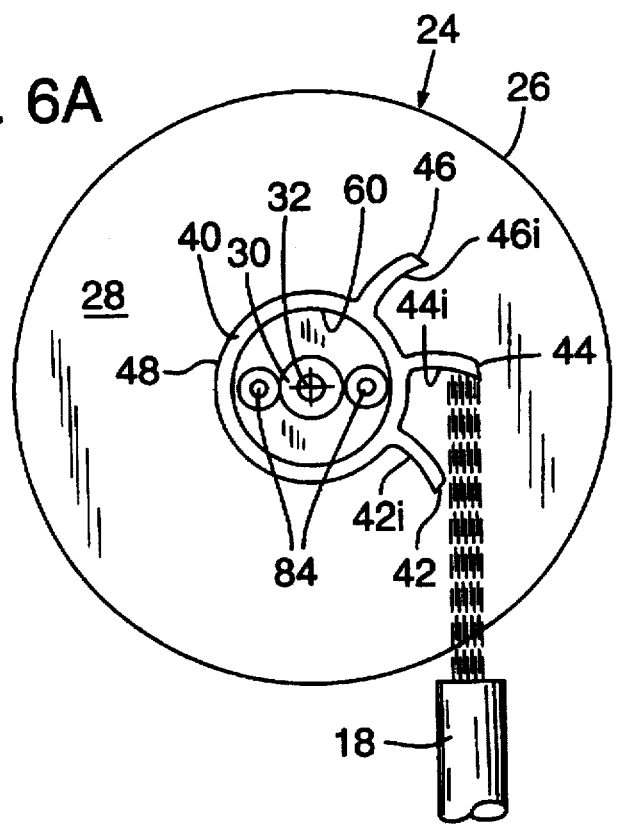
FIGS. 6A and 6B are diagrams that show the interaction between fluid flowing from the inlet port to the impeller to assist in explaining the operation of the flow rate meter of FIGS. 1 and 2.
Figure 6B:
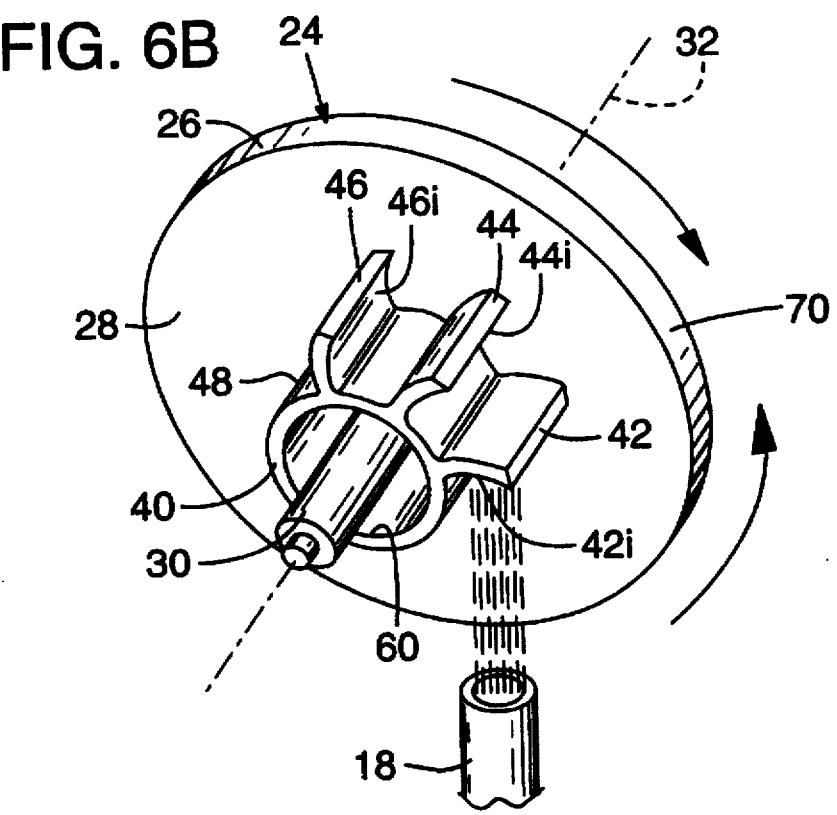
Figure 7A:
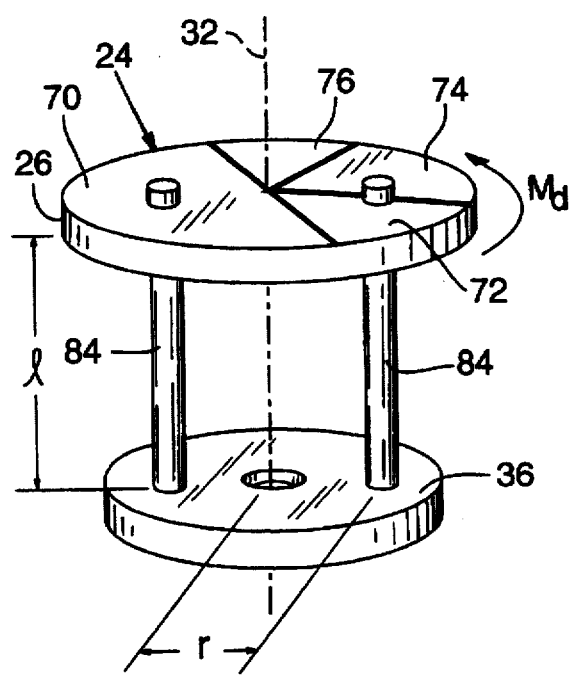
FIGS. 7A and 7B are diagrams that assist in explaining the function of the torsionally resistant element in the flow rate meter of FIGS. 1 and 2.
Figure 7B:
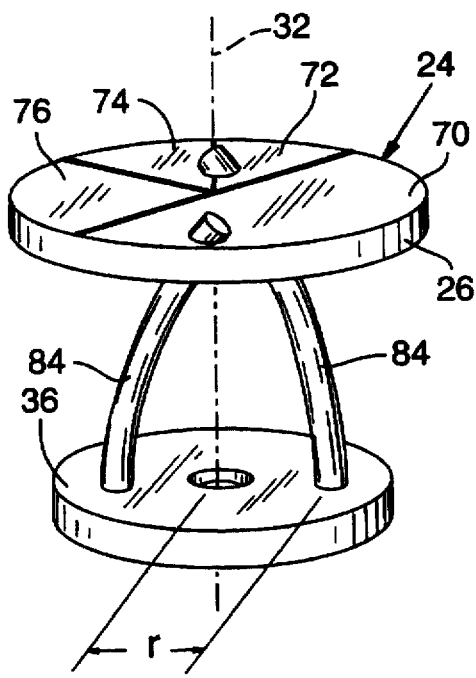

FIGS. 6A and 6B are simplified diagrams showing the interaction of the fluid flowing through inlet port 18 and striking the vanes on impeller 24. Depending on the angular position of impeller 24, fluid entering housing 14 strikes the vane or vanes 42, 44, and 46 whose respective inner surfaces $42_i$, $44_i$, and $46_i$ are positioned in the line of fluid discharge. In a low friction system, impeller 24 would rotate continuously in a counter-clockwise direction about axis of rotation 32, much like a waterwheel. FIGS. 7A and 7B are diagrams showing the function of U-shaped wire 56 of applying a counteracting torque to impede the rotation of impeller 24.

With reference to FIGS. 7A and 7B, U-shaped wire 56 has two legs 84 each of a length "l" and separated by a distance "r" from axis of rotation 32. FIG. 7A shows a straight line orientation of legs 84 with impeller 24 undergoing a no fluid flow condition, and FIG. 7B shows a bending orientation of legs 84 with impeller 24 undergoing a steady-state fluid flow condition. Legs 84 of wire 56 bend to resist the counter-clockwise angular motion of impeller 24 at an angular position that is indicative of the incoming fluid flow rate through inlet port 18.

As shown in FIG. 6A, fluid discharging from inlet port 18 strikes surface $44_i$ of vane 44. An increase in fluid flow rate would cause impeller 24 to increase its counter-clockwise angular displacement and thereby increase the bending forces applied to legs 84 to present surface $42_i$ of vane 42 into the line of fluid discharge. Similarly, a decrease in fluid flow rate would cause impeller 24 to move in a clockwise direction to decrease its angular displacement from its present position and thereby decrease the bending forces applied to legs 84 to present surface $46_i$ of vane 46 into the line of fluid discharge. Thus, the angular position of impeller 24 gives a direct indication of fluid flow into housing 14.

For a given fluid flow rate, the fluid force applied to impeller 24 and the counteracting torque applied by wire 56 to impeller 24 reach a steady-state equilibrium. Because they are angularly spaced apart around axis of rotation 32, vanes 42, 44, and 46 provide generally discrete flow rate steps. The angular displacement of impeller 24 is not in completely discrete steps because certain flow rates would cause angular orientations of impeller 24 that position portions of two vanes in the line of fluid discharge.

Flow rate meter 10 does not rely on gravity to create a restoring force that provides a flow rate indication. Disk 26 is constructed of a material, such as the ABS polymer, that is neutrally buoyant in water. Thus, the flow rate of fluid entering and exiting housing 14 is substantially unchanged because the impeller 24 and wire 56 assembly requires very low forces and as a consequence introduces negligible friction into the flow rate meter system. Color-coded segments 72, 74, and 76 are placed on surface 70 of disk 26 so that the color viewable through window 12 corresponds to the rate of fluid flow through flow rate meter 10.

As an example, wire 56 is of 0.36 mm diameter stainless steel, and the vanes are mutually spaced apart by 45° around a 3.8 cm diameter disk 26 of impeller 24. The length "l" of each leg 84 is 20 mm, and the distance "r" from axis of rotation 32 is 3.2 mm. Color-coded segments 72, 74, and 76 each subtend a 60° angular segment and correspond to flow rates of greater than 1.9 liters (0.5 gallon) per minute (green), 1.14–1.5 liters (0.3–0.4 gallon) per minute (yellow), and less than 1.14 liters (0.3 gallon) per minute (red), respectively.

Figure 8:
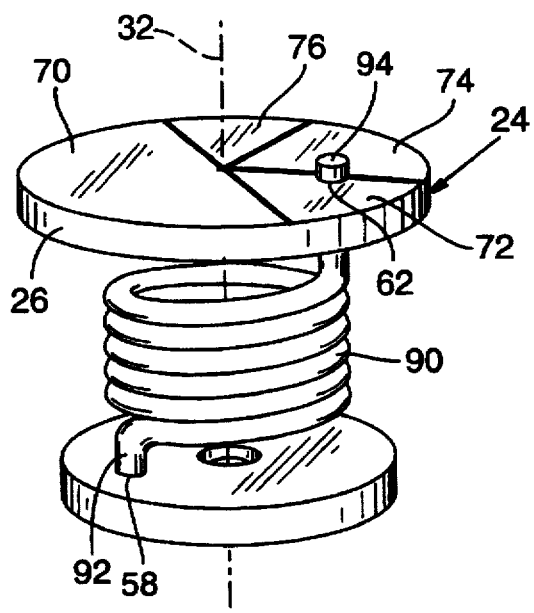
FIG. 8 is a diagram showing a coil spring as an alternative torsionally resistant element.
Figure 11A:
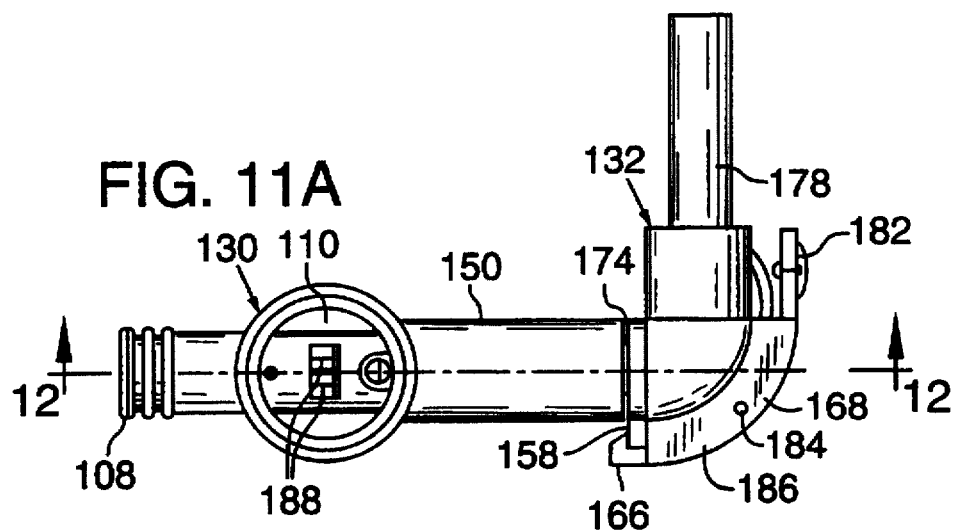
FIGS. 11A and 11B are side elevation views of the quick-release fitting connected to, and FIG. 11C is a side elevation view of the quick-release fitting disconnected from, the conduit extension of the diverter.
Figure 11B:
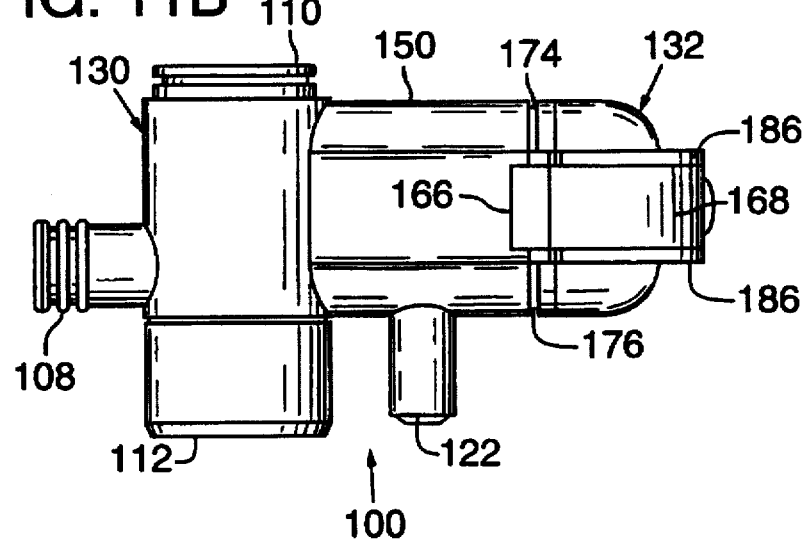
Figure 11C:
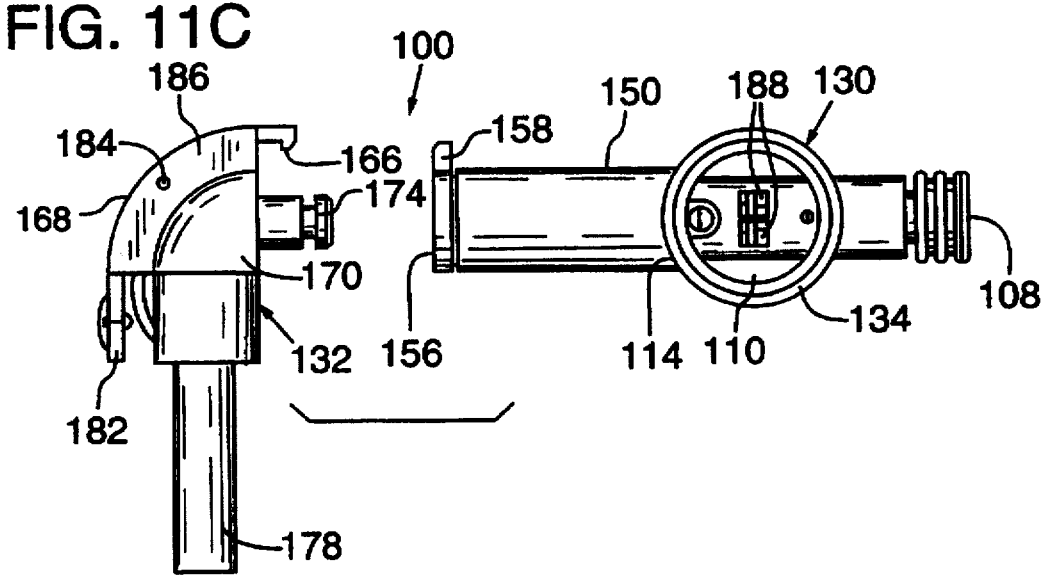

FIG. 8 shows a coil spring 90 connected between disk 26 and floor 36 as an alternative torsionally resistant element. Coil spring 90 has an endpiece 92 secured in a hole 58 in floor 36, and an endpiece 94 secured in a hole 62 in disk 26. The axis of coil spring 90 is collinear to axis of rotation 32. Coil 90 twists along its axis and thereby produces a counteracting torque in response to the fluid force applied to impeller 24 in a manner analogous to that produced by wire 56.

FIG. 9 shows a manually actuatable fluid flow diverter 100 that is connected to an outlet 102 of a standard household faucet waterspout 104 positioned over a sink 106. Diverter 100 includes a valve stem 108, which when not retracted (as shown), permits fluid to flow through a primary inlet 110 of diverter 100 and discharge through a primary outlet 112 of diverter 100. A user pulls valve stem 108 outwardly to divert fluid flow to a diverter inlet 114, through a hose 116 to a fluid filter assembly 118, and through a hose 120 to a diverter discharge outlet 122. The construction of diverter 100 is described below with reference to FIGS. 10A and 10B, FIGS. 11A, 11B, and 11C, and FIGS. 12A and 12B.

Diverter 100 comprises a body 130 and a quick-release fitting 132 that is easily disconnectable from body 130. Body 130 and fitting 132 are preferably made of a plastic that is FDA approved for use with potable water. This quick-disconnect capability allows a user to keep the less readily detachable body 130 of diverter 100 permanently attached to waterspout 104, even when greater sink clearance is desired. Diverter 100 is secured to waterspout 104 by a threaded connector ring 134 that is positioned at an end of body 130 and mates with complementary threading inscribed in waterspout 104. Primary outlet 112 is preferably the discharge end of a conventional aerator. Primary inlet 110 and primary outlet 112 define a primary fluid flow pathway 136 (FIG. 12A) when valve stem 108 is in its fully inserted position within body 130; and diverter inlet 114 and diverter discharge outlet 122, together with interconnecting conduits such as hoses 116 and 120 and fluid filter assembly 118, define a secondary fluid flow pathway 138 when valve stem 108 is in its retracted position within body 130 (FIG. 12B). Thus, by actuating valve stem 108, a user can manually select whether fluid flowing from waterspout 104 flows along primary pathway 136 or secondary pathway 138.

A conduit extension 150 formed as an integral part of body 130 includes tubular inlet conduit 152 and outlet conduit 154 that are in fluid communication with, respectively, diverter inlet 114 and diverter discharge outlet 122. Conduit extension 150 terminates in an end surface 156. A flange 158 projects outwardly in the plane of end surface 156 to receive a hooked endpiece 166 of a lever arm 168 that is pivotally mounted to quick-release fitting 132 to secure it and body 130 together.

Fitting 132 comprises a holder 170 having opposite ends from which a first pair of tubes 174 and 176 extend and a second pair of tubes 178 and 180 extend. Tubes 174 and 176 fit into the respective inlet and outlet conduits 152 and 154 of conduit extension 150, and tubes 178 and 180 receive the respective hoses 116 and 120 connected to fluid filter assembly 118. Hoses 116 and 120 fit over the respective tubes 178 and 180 and remain in place by an adhesive.

Lever arm 168 is an arcuate member having a shape formed to follow the contour of fitting 132 such that hooked endpiece 166 is positioned near tubes 174 and 176 and a free end 182 functioning as a push tab is positioned near tubes 178 and 180. Lever arm 168 is movable about a pivot 184 supported between two shoulders 186 extending from holder 170. The first and second pairs of tubes are disposed at right angles for two reasons. One reason is to align hoses 116 and 120 with waterspout 104 in such a way that provides better sink clearance for the user. The other reason is to configure fitting 132 as a grip handle for easy insertion of tubes 174 and 176 into or disconnection of tubes 174 and 176 from body 130. Thus, to disconnect fitting 132 from body 130, a user places fitting 132 between his thumb and index finger and squeezes them together to apply a force to free end 182 that pivotally moves hooked endpiece 166 of lever arm 168 away from flange 158 and thereby permits removal of fitting 132 from body 130.

With particular reference to FIG. 12A, valve stem 108 is in its fully inserted position within body 130, and fitting 132 is disconnected from body 130. Whenever valve stem 108 is in this position, fluid enters primary inlet 110, flows through openings 188 (FIGS. 11A and 11C) in body 130, and exits primary outlet 112 along primary pathway 136 as shown. Valve stem 108 has along its length three spaced-apart blocking portions 108a, 108b, and 108c that direct the fluid flow along the appropriate path. In FIG. 12A, blocking portion 108a is positioned so as not to obstruct openings 188 but to block fluid flow into a tube 190 leading to inlet 152 of conduit extension 150. Blocking portion 108c is positioned to block leakage fluid flow into discharge outlet 122 from outlet 154 of conduit extension 150.

With particular reference to FIG. 12B, valve stem 108 is in its retracted position within body 130, and fitting 132 is connected to body 130. Whenever valve stem 108 is in this position, fluid enters primary outlet 110, flows around the narrower region of valve stem 108 between blocking portions 108a and 108b and upwardly through tube 190, enters inlet 152 of conduit extension 150, and ultimately reaches discharge outlet 122 along secondary pathway 138 as shown. In FIG. 12B, blocking portion 108a is positioned to block openings 188 to primary outlet 112, and blocking portion 108b is positioned to direct fluid into tube 190. Blocking portion 108c is positioned to open discharge outlet 122 and thereby permit fluid flow through it.

With reference to FIGS. 12A and 12B, inlet 152 of conduit extension 150 houses a spring-actuatable shut-off valve 192 that is normally closed and therefore blocks fluid flow through inlet 152 when fitting 132 is disconnected from body 130 (FIG. 12A). Thus, even if valve stem 108 is retracted (as in FIG. 12B) to divert fluid flow along secondary pathway 138, fluid will not exit diverter 100 when body 130 and fitting 132 are disconnected. Tube 174 is of sufficient length so that when fitting 132 is connected to body 130, tube 174 pushes against and thereby deactivates shut-off valve 192 to allow fluid flow along secondary pathway 138 whenever valve stem 108 is positioned to divert the fluid flow.

Figure 13:
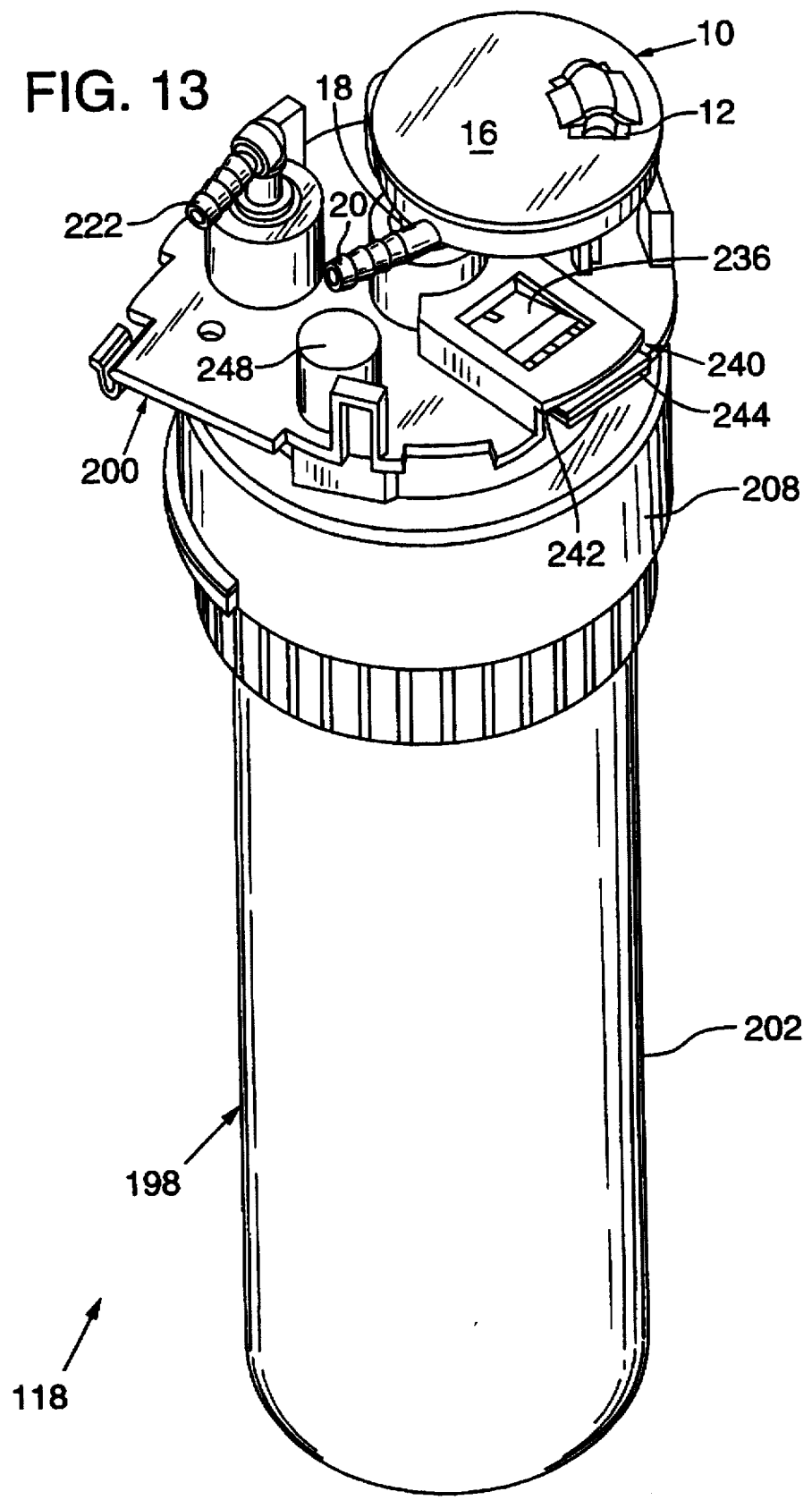
FIG. 13 is an isometric view of the readily releasable fluid filter assembly of the present invention.

FIG. 13 shows fluid filter assembly 118 of the present invention having a cartridge filter 198 that is readily detachable from a manifold 200. FIG. 14 shows cartridge filter 198 apart from manifold 200. FIGS. 15A, 15B, and 15C are respective isometric views of cartridge filter 198 completely assembled, disassembled, and exploded apart to show its components. With reference to FIGS. 13 and 14 and FIGS. 15A, 15B, and 15C, cartridge filter 198 comprises a tubular housing 202 with a closed bottom end that supports a filter element 204 inserted into housing 202. Filter element 204 is fixedly mounted to and depends from an interior surface 206 of an end cap 208. Filter element 204 is mounted by an adhesive to end cap 208 to allow the user to remove filter element 204 from housing 202 without gripping filter element 204. Filter element 204 can be a ceramic particle filter; a conventional carbon block that removes lead, chlorine, and other minerals; or a ceramic-carbon block combination such as the filter described in U.S. Pat. No. 5,164,085 and sold by N.R.G. Enterprises, Inc. of Mercer Island, Wash. Housing 202 and end cap 208 have complementary screw threads that enable end cap 208 to function as a screw cap to cover housing 202 and enclosed cartridge filter 198.

Unfiltered fluid flows into an end cap inlet tube 210 and passes through filter element 204. Filtered fluid flows out of an end cap outlet tube 212. Inlet tube 210 and outlet tube 212 are positioned on a top surface 218 of end cap 208. Manifold 200 has a bottom surface 220 through which an inlet conduit 222 and an outlet conduit 224 extend. Inlet conduit 222 holds a standard O-ring, and outlet conduit 224 holds a push-in fitting 226 (FIGS. 16 and 17), such as a Super Speedfit® push-in fitting manufactured by John Guest. Inlet conduit 222 with its O-ring and outlet conduit 224 with its push-in fitting 226 are positioned to mate with the respective inlet tube 210 and outlet tube 212. Thus, inlet tube 210 and inlet conduit 222 with its O-ring form a first connector combination, and outlet tube 212 and outlet conduit 224 with its push-in fitting 226 form a second connector combination.

Figure 16:
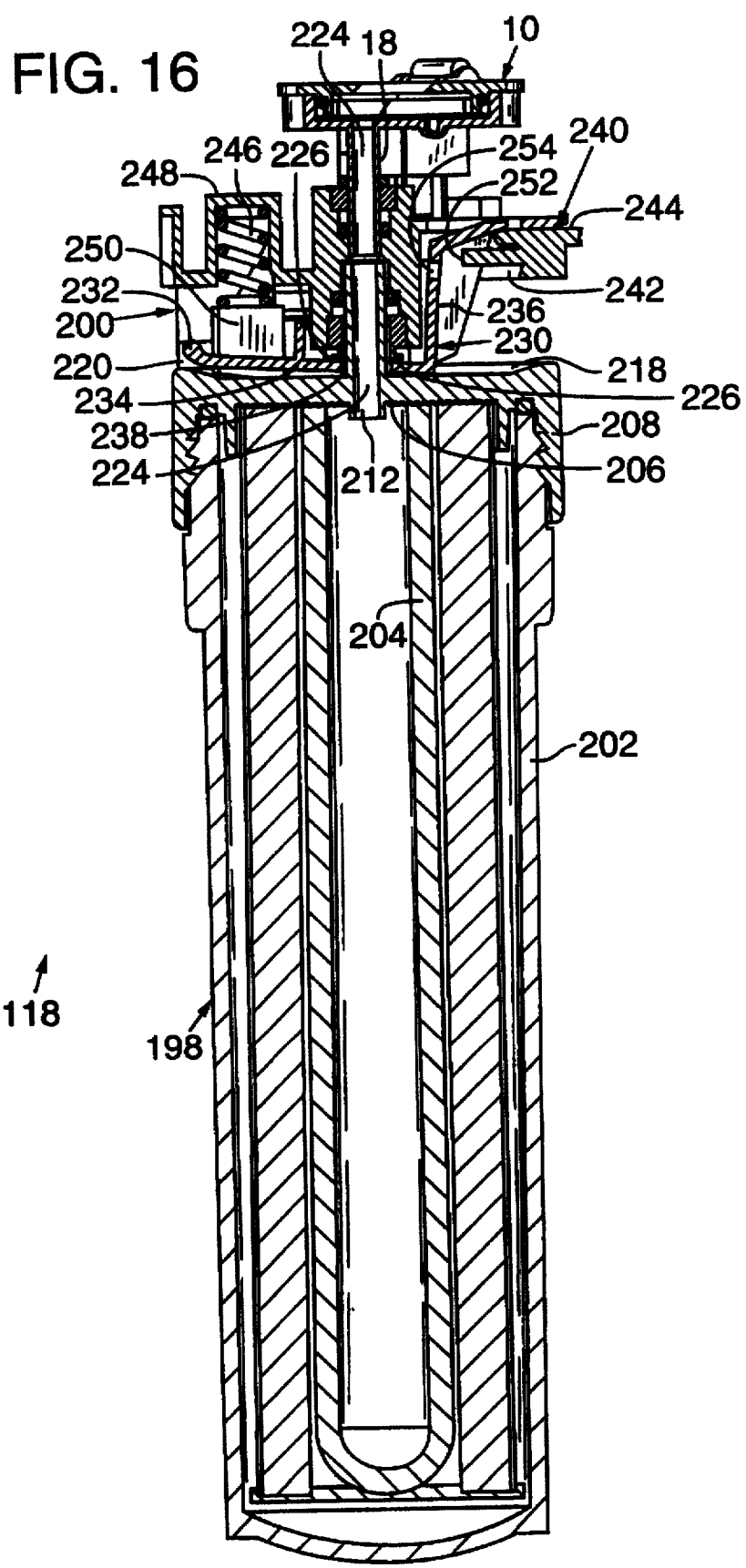
FIGS. 16 and 17 are cross-sectional views of the filter assembly shown in FIGS. 13 and 14, respectively.
Figure 17:
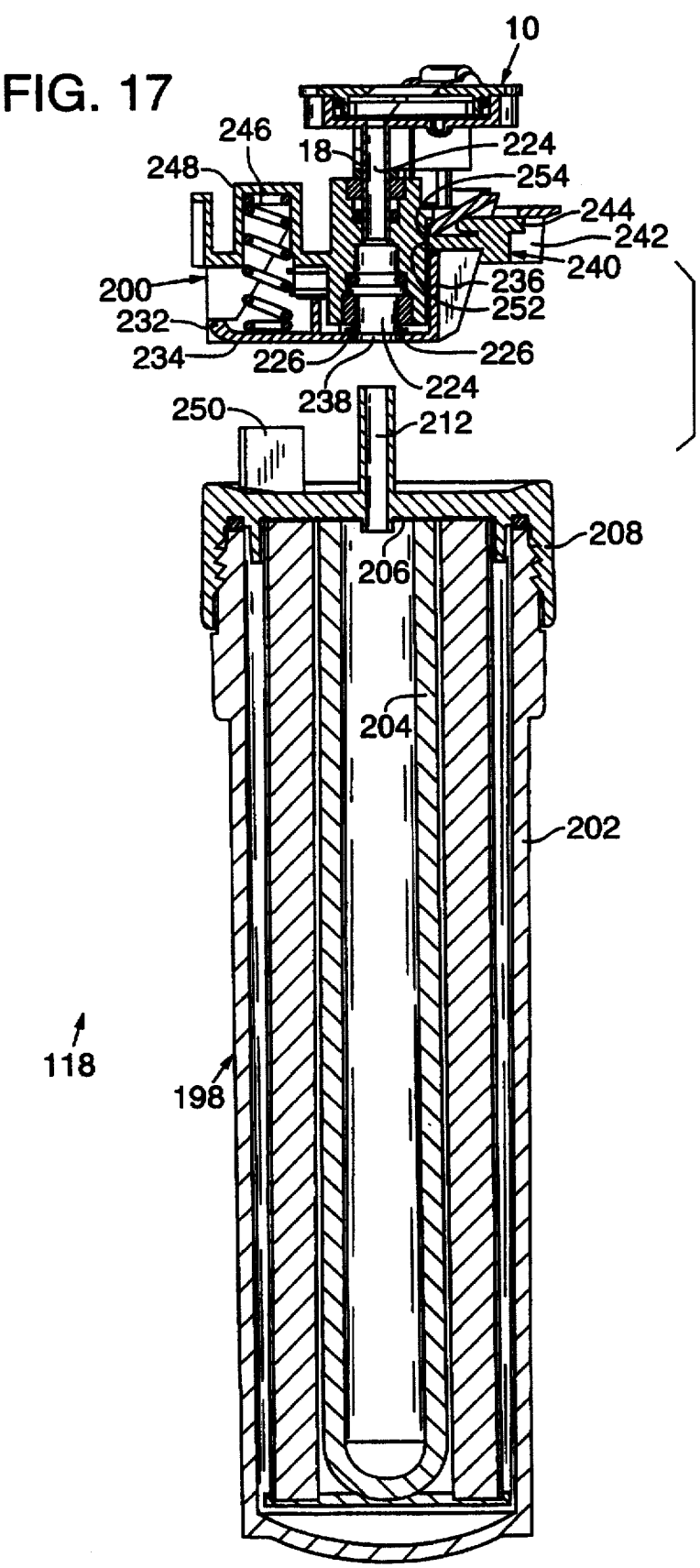

FIGS. 16 and 17 are cross-sectional views of the filter assembly shown in FIGS. 13 and 14, respectively. With reference to FIGS. 13, 14, 16, and 17, a lever mechanism 230 is pivotally movable about a pivot mounting 232 near bottom surface 220 of manifold 200. Lever mechanism 230 is formed as one piece with a straight section 234 and a bent section 236. Straight section 234 is positioned nearly parallel to top surface 218 of end cap 208 and has a hole 238 through which outlet tube 212 extends. The diameter of hole 238 is slightly larger than the outer diameter of outlet tube 212 so that straight section 234 can make contact against pushing-in fitting 226. One end of bent section 236 extends from straight section 234 at an obtuse angle of about 95°, and the free end of bent section 236 extends away from the plane of bottom surface 220 of manifold 200 and contacts an actuator slide mechanism 240. Slide mechanism 240 includes a guide 242 in which a push tab 244 is slidably mounted. Push tab 244 nominally extends outwardly of manifold 200 so that a user can push push tab 244 to cause it to contact the free end of bent section 236.

Whenever a user desires to disconnect manifold 200 from housing 202 to facilitate filter cleaning and maintenance, a user pushes push tab 242 to pivotally move straight section 234 upwardly against push-in fitting 226 to release outlet tube 212 and thereby allow separation of manifold 200 from housing 202. An eject spring 246 fixed within a cup 248 in bottom surface 220 of manifold 200 and positioned against pedestal 250 on top surface 218 of end cap 208 near bent section 236 causes housing 202 to pop away from manifold 200 whenever the user pushes push tab 244. Eject spring 246 remains in cup 248 after separation of manifold 200 from cartridge filter 198.

FIG. 16 shows that when manifold 200 and cartridge filter 198 are assembled, a post 252 on push tab 244 is positioned away from bent section 236. FIG. 17 shows that when a user pushes push tab 244 to separate manifold 200 from cartridge filter 198, post 252 fits into a hole 254 in bent section 236 to lock straight section 234 in place against push-in fitting 226 and thereby ensure unimpeded removal of inlet tube 210 and outlet tube 212 from inlet conduit 222 and outlet conduit 224, respectively. A coil spring (not shown) may be wrapped around post 252 to facilitate the return of push tab 244 to the position shown in FIG. 16 when manifold 200 and cartridge filter 198 are re-assembled.

FIGS. 13, 14, 16, and 17 show the fluid connection lines for one embodiment of filter assembly 118 in which flow rate meter 10 is connected to the outlet of manifold 200. Specifically, inlet 18 of flow rate meter 10 fits over outlet conduit 224 of manifold 18, and the barbed outer surface of outlet 20 of flow rate meter 10 receives hose 120. The barbed outer surface of inlet conduit 222 of manifold 200 receives hose 116. Hoses 116 and 120 are routed and contained within a hose management compartment 260 (FIGS. 19 and 20) of a shell-like container 262 (FIGS. 18A and 18B) for fluid filter assembly 118, as is described below.

Figure 18A:
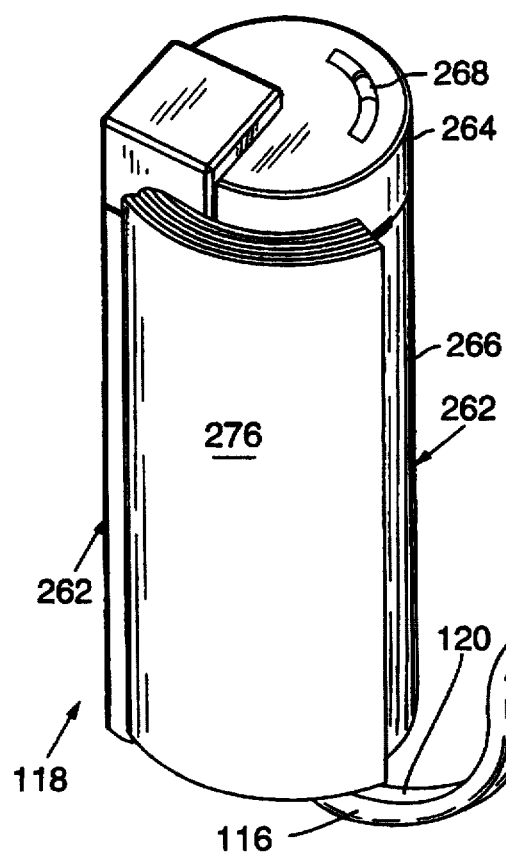
FIGS. 18A and 18B show for the fluid filter assembly a shell-like container, respectively, fully assembled and with its top cap removed.
Figure 18B:
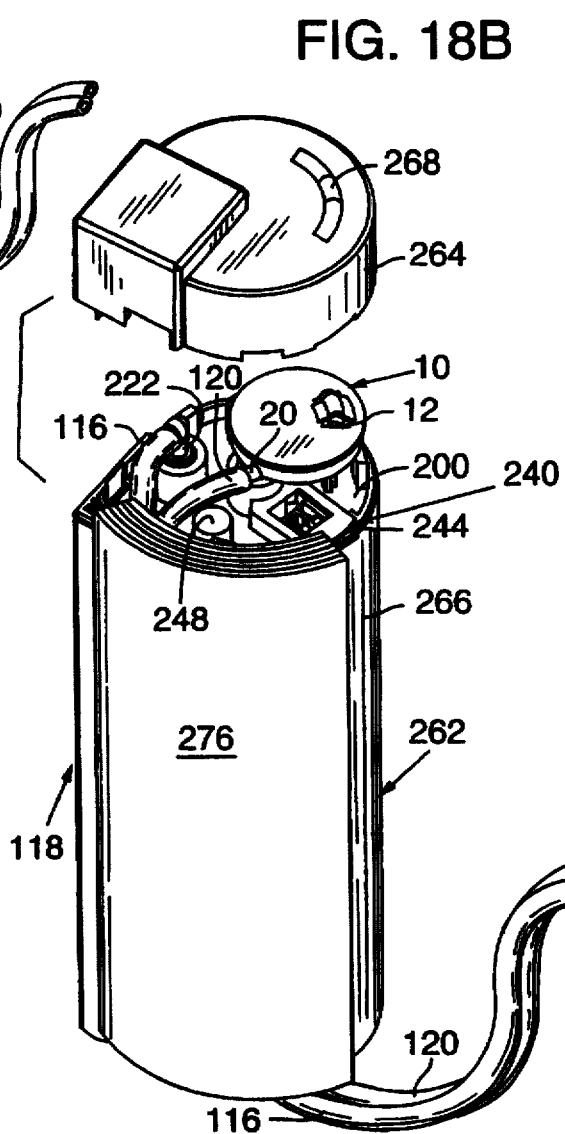

FIGS. 18A and 18B show container 262 fully assembled and with its top cap 264 removed. With reference to FIGS. 18A and 18B, container 262 includes a tubular body 266 that fits over cartridge filter 198. Body 266 has an open bottom and an open top that is covered by manifold 200. Removable top cap 264 has a opening 268 through which window 12 of flow rate meter 10 can be viewed. A user removes cartridge filter 198 by pushing push tab 244 to separate cartridge filter 198 from manifold 200 and pulling housing 202 through the bottom opening of container 262. This procedure can be carried out with top cap 264 positioned on or removed from body 266.

FIGS. 19 and 20 show hose management compartment 260 that stores the unused lengths of hoses 116 and 120 when fluid filter assembly 118 is in service. Compartment 260 is a rectangular, shallow storage region protruding from the outer surface of body 266 of container 262. Compartment 260 has a length 271 and a width 273. Hoses 116 and 120 are routed within compartment 260 and emerge from it through a first or filter port 275 and a second or faucet port 277 such that filter ends 279 of hoses 116 and 120 are proximal to filter port 275 and faucet ends 283 of hoses 116 and 120 are proximal to faucet port 277. With reference to FIG. 19, skilled persons will appreciate that when cover 276 is placed over compartment 260 to close it, the depth of compartment 260, which is defined by the distance between the outer surface of body 266 of container 262 and the inner surface of cover 276, is only slightly greater in size than the combined width of hoses 116 and 120. Although it is unnecessary to shorten or lengthen the amount of hose present outside of compartment 260, a removable cover 276 gives access to the interior of compartment 260.

Compartment 260 has an inner surface 278 to which a pair of spaced-apart U-shaped guide pegs 280 are mounted side by side along an axis perpendicular to length 271 of compartment 260 and with their open ends pointing in opposite directions. Guide pegs 280 form bearing surfaces 282 of a guide structure for hoses 116 and 120 as a user manually feeds them in a lengthwise direction 284 into compartment 260. FIG. 20 shows that the placement and orientation of guide pegs 280 near faucet port 277 and the routing of hoses 116 and 120 around bearing surfaces 282 within compartment 260 form for hoses 116 and 120 a serpentine path (shown in phantom lines) that prevents them from kinking and provides for continuous length adjustment so that there need be no excess length of hose outside of cartridge filter 198 after installation.

The capability of fluid filter assembly 118 to provide information about the operational status of cartridge filter 198 can be enhanced by the inclusion of a volume meter. A volume meter indicates the ability of a filter element to reduce the number of chemicals present in a flow stream; whereas, a flow rate meter provides a visual indication of the ability of a filter element to remove particulates. FIG. 21 is a block diagram of an alternative embodiment that includes a volume meter 290 positioned upstream of flow rate meter 10 between end cap outlet tube 212 and flow rate meter inlet port 18. Volume meter 290 is of a conventional, commercially available type that restricts or cuts off fluid flow after a predetermined quantity of fluid has passed through it. One suitable type of volume meter would be a Water Minder 2000 Meter Valve that is available from Flowmatic Systems in Clearwater, Fla.

The advantage of this embodiment is that it provides a measure of the ability of filter element 204 to reduce the number of chemicals in and remove particulates from the flow stream. Flow rate meter 10 provides the user by means of a single visual indicator information as to whether filter element 204 is losing its chemical reduction capacity or is clogged. Thus, volume meter 290 can be conveniently concealed within fluid filter assembly 118 because the user needs no additional indicator.

It will be obvious to those having skill in the art that many changes may be made to the details of the above-described embodiments of this invention without departing from the underlying principles thereof. For example, manifold 200 and lever mechanism 230 can be readily modified to provide the quick-release function with a push-in fitting installed in each of inlet conduit 222 and outlet conduit 224. Moreover, the push-in fitting or fittings installed in manifold 200 could be exchanged with the end cap tube or tubes of cartridge filter 198. The scope of the present invention should, therefore, be determined only by the following claims.

We claim:

1. A fluid filter assembly, comprising:

a filter element in fluid communication with a filter inlet and a filter outlet so that fluid flowing into the filter inlet passes through the filter element and flows out of the filter outlet;

a container for housing the filter element, the container including a hose storage compartment within which lengths of inlet and outlet hoses are routed side by side along their lengths, the hose storage compartment having first and second ports through which the inlet and outlet hoses pass, the inlet and outlet hoses each having filter and faucet ends that pass through the respective first and second ports, the filter end of the inlet hose in fluid communication with the filter inlet and the filter end of the outlet hose in fluid communication with the filter outlet; and a hose management guide structure located within the hose storage compartment to facilitate adjustment of the lengths of the inlet and outlet hoses and storage of any unneeded hose length after fluid filter assembly installation, the hose management guide structure including multiple spaced-apart pegs placed within the hose storage compartment, the multiple pegs including two spaced-apart, proximally positioned pegs between which the inlet and outlet hoses are routed so that they travel along and their lengths define within the hose storage compartment a serpentine path that loops below one and above the other, of the two spaced-apart pegs as the inlet and outlet hoses are fed lengthwise through the second port.

2. The fluid filter assembly of claim 1 in which the hose storage compartment protrudes from the container to form a shallow storage region.

3. The fluid filter assembly of claim 1 in which the hose storage compartment protrudes from the container to form a shallow storage region and has an inner surface to which the two spaced-apart pegs are mounted to form a bearing surface for the inlet and outlet hoses as they are fed through the second port.

4. The fluid filter assembly of claim 3 in which the two spaced-apart pegs are U-shaped and are located with their open ends facing in opposite directions.

5. The fluid filter assembly of claim 4, further comprising a cover removably mounted on the hose storage compartment.

6. The fluid filter assembly of claim 1 in which the spaced-apart pegs are U-shaped and are located side-by-side with their open ends facing in opposite directions, the pegs forming bearing surfaces for the inlet and outlet hoses as they are fed into the hose storage compartment.

7. The fluid filter assembly of claim 6, further comprising a cover removably mounted on the hose storage compartment.

8. The fluid filter assembly of claim 6 in which the hose storage compartment has a length and the two spaced-apart pegs are positioned along an axis transverse to the length of the hose storage compartment.

9. The fluid falter assembly of claim 1 which the two spaced-apart pegs are positioned proximal to the second port.

10. The fluid filter assembly of claim 9 in which the two spaced-apart pegs are U-shaped and are located with their open ends facing in opposite directions.

11. The fluid filter assembly of claim 1 in which the container for housing the filter element has an outer surface that forms for the hose storage compartment an inner surface to which the two spaced-apart pegs are mounted.

12. The fluid filter assembly of claim 1 in which the hose storage compartment has a length and the two spaced-apart pegs are positioned along an axis transverse to the length of the hose storage compartment.

13. The fluid filter assembly of claim 1, further comprising a cover for and an inner surface of the hose storage compartment, and in which the lengths of the inlet and outlet hoses routed side by side have a combined cross-sectional dimension and the cover has an inner surface, the hose storage compartment having a depth defined by a distance between the inner surfaces of the hose storage compartment and the cover, the distance being slightly greater than the combined cross-sectional dimension so as to cooperate with the multiple pegs to guide the inlet and outlet hoses along the serpentine path.

* * * * *